United States Patent
Tsai (10) Patent No.: US 11,749,016 B2
(45) Date of Patent: Sep. 5, 2023

(54) METHOD FOR FINGERPRINT RECOGNITION AND FINGERPRINT RECOGNITION DEVICE

(71) Applicant: Novatek Microelectronics Corp., Hsinchu (TW)

(72) Inventor: Jung-Yu Tsai, New Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/950,052

(22) Filed: Sep. 21, 2022

(65) Prior Publication Data

US 2023/0016367 A1 Jan. 19, 2023

Related U.S. Application Data

(63) Continuation of application No. 17/113,097, filed on Dec. 6, 2020, now Pat. No. 11,475,705.

(60) Provisional application No. 62/944,319, filed on Dec. 5, 2019.

(51) Int. Cl.
| | |
|---|---|
| *G06V 40/12* | (2022.01) |
| *G06F 3/04883* | (2022.01) |
| *G06K 9/62* | (2022.01) |
| *G06F 18/21* | (2023.01) |
| *G06V 10/22* | (2022.01) |

(52) U.S. Cl.
CPC ...... *G06V 40/1347* (2022.01); *G06F 3/04883* (2013.01); *G06F 18/2163* (2023.01); *G06V 10/22* (2022.01); *G06V 40/1365* (2022.01)

(58) Field of Classification Search
CPC .............. G06V 40/1347; G06V 10/22; G06V 40/1365; G06V 40/1318; G06F 3/04883; G06F 18/2163; G06F 21/32
See application file for complete search history.

(56) References Cited

U.S. PATENT DOCUMENTS

| | | | |
|---|---|---|---|
| 2018/0253614 A1* | 9/2018 | Lee | G06V 40/13 |
| 2020/0293746 A1* | 9/2020 | Hu | G06V 40/13 |

* cited by examiner

*Primary Examiner* — Abhishek Sarma
(74) *Attorney, Agent, or Firm* — JCIPRNET (57) ABSTRACT

A method for fingerprint recognition and a fingerprint recognition device are provided. The method includes the following steps. A touch position of a touch panel is obtained as a fingerprint position. A fingerprint recognition operation is performed according to the fingerprint position. Whether the fingerprint recognition operation is successful is determined. In response to determining that the fingerprint recognition operation is not successful, at least one first position of the touch panel as an updated fingerprint position is generated according to the touch position of the touch panel, and the fingerprint recognition operation is performed according to the updated fingerprint position.

24 Claims, 6 Drawing Sheets

METHOD FOR FINGERPRINT RECOGNITION AND FINGERPRINT RECOGNITION DEVICE

CROSS-REFERENCE TO RELATED APPLICATION

This application is a continuation application of and claims the priority benefit of a prior application Ser. No. 17/113,097, filed on Dec. 6, 2020. The prior application Ser. No. 17/113,097 claims the priority benefit of U.S. provisional application Ser. No. 62/944,319, filed on Dec. 5, 2019. The entirety of each of the above-mentioned patent application is hereby incorporated by reference herein and made a part of this specification.

BACKGROUND OF THE INVENTION

Field of the Invention

The invention relates to a fingerprint recognition technique, and more particularly to a method for fingerprint recognition and a fingerprint recognition device.

Description of Related Art

In fingerprint recognition techniques, a user first registers or enters their own registered fingerprint image or file in an electronic device, and when using the electronic device is needed, a finger is placed on a fingerprint sensor for recognition. When the fingerprint recognition is successful, the electronic device using the fingerprint recognition technique may be successfully unlocked for use by a user.

Moreover, when fingerprint recognition fails, there are two possibilities: the first possibility is that this fingerprint is an unregistered fingerprint, and therefore the fingerprint recognition is bound to fail; the second possibility is that the fingerprint is a registered fingerprint, but because the fingerprint texture is affected by some factors (such as dry weather, finger injury, water droplet on the fingerprint, etc.), the fingerprint recognition result is affected, such that fingerprint recognition fails. When the fingerprint recognition fails, the electronic device often informs the user to lift their finger and press it on the fingerprint sensor again, thus resulting in repeated attempts to trying different pressing positions until the recognition is successful. However, if the fingerprint image contains areas not readily recognized, the user needs to change the pressing position multiple times during fingerprint recognition, resulting in worse user somatosensory feedback on fingerprint recognition.

SUMMARY OF THE INVENTION

The invention provides a method for fingerprint recognition and a fingerprint recognition device that may perform fingerprint recognition multiple times without a user adjusting a pressing position of a finger and without being aware to increase the accuracy of the fingerprint recognition and improve the somatosensory feedback of the user for fingerprint recognition.

The method for fingerprint recognition of an embodiment of the invention includes the following steps: obtaining a touch position of a touch panel as a fingerprint position; determining a fingerprint readout zone according to the fingerprint position, and performing a fingerprint sensing operation according to the fingerprint readout zone to obtain a fingerprint image to be determined corresponding to the fingerprint readout zone; performing a fingerprint recognition operation according to the fingerprint image to be determined; generating at least one first position of the touch panel according to the touch position of the touch panel and fingerprint matching information in response to determining that the fingerprint recognition operation is not successful; and, determining an updated fingerprint readout zone according to the at least one first position, and performing the fingerprint sensing operation according to the updated fingerprint readout zone.

The fingerprint recognition device of an embodiment of the invention includes a touch panel, a fingerprint sensor, a touch sensor, a host controller, and a fingerprint readout device. The touch sensor is coupled to the touch panel to sense a touch position of the touch panel as a fingerprint position. The host controller is coupled to the touch sensor. The fingerprint readout device is coupled to the fingerprint sensor and the host controller. The fingerprint readout device determines a fingerprint readout zone according to the fingerprint position and performs a fingerprint sensing operation according to the fingerprint readout zone, to obtain a fingerprint image to be determined corresponding to the fingerprint readout zone. The host controller performs a fingerprint recognition operation according to the fingerprint image to be determined. One of the host controller and the fingerprint readout device generates at least one first position of the touch panel according to the touch position of the touch panel and fingerprint matching information in response to the host controller determines that the fingerprint recognition operation is not successful. The fingerprint readout device determines an updated fingerprint readout zone according to the at least one first position, and performs the fingerprint sensing operation according to the updated fingerprint readout zone.

Based on the above, in the fingerprint recognition device and the corresponding method of an embodiment of the invention, another position as the updated fingerprint position adjacent to the touch position is automatically generated according to the touch position provided by the touch sensor when the first fingerprint recognition fails, and the updated fingerprint readout zone is set using the updated fingerprint position to perform fingerprint recognition again. Therefore, in the present embodiment, when the user does not adjust the pressing position of the finger and the fingerprint recognition fails for the first time, fingerprint recognition is performed multiple times in different readout zones, so that the accuracy of fingerprint recognition may still be increased without having the user change the pressing position multiple times, thus improving the user's somatosensory feedback on fingerprint recognition.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
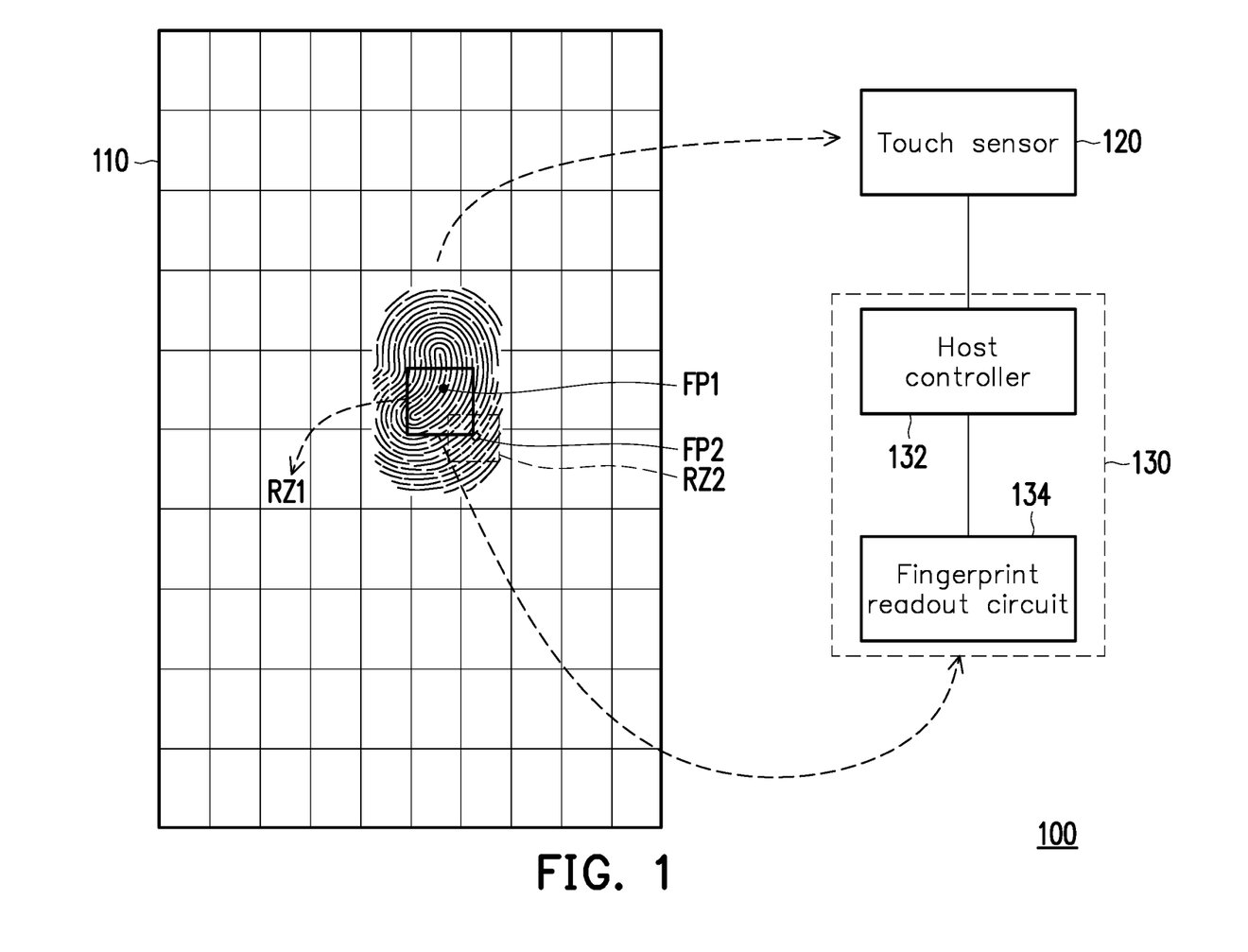
FIG. 1 is a diagram of a fingerprint recognition device according to an embodiment of the invention.

FIG. 1 is a diagram of a fingerprint recognition device 100 according to an embodiment of the invention. The fingerprint recognition device 100 may be applied to various electronic devices, such as a smart phone, a tablet computer, a multimedia player, etc. The fingerprint recognition device 100 mainly includes a touch panel 110, a touch sensor 120, and a controller 130. In the present embodiment, the controller 130 may include a host controller 132 and a fingerprint readout circuit 134. The host controller 132 may be a system core processing unit, an application processor in an electronic device, a central processor, etc. The fingerprint readout circuit 134 of the present embodiment may be a single fingerprint readout chip that is independently provided. In some embodiments, the touch sensor 120 and the fingerprint readout device in the controller 130 may be integrated into a fingerprint, touch, and display drive integrated (FTDI) chip.

The touch panel 110 may be a touch display panel, the touch panel 110 includes a fingerprint sensor, and the fingerprint sensor includes a fingerprint sensing pixel array. An optical fingerprint sensor may be embedded in the touch display panel, and a capacitive fingerprint sensor may be embedded in the touch display panel or arranged outside the touch panel 110. The fingerprint sensing panel is combined with the touch display panel, so that the fingerprint sensing area on the fingerprint sensing panel and the display area on the touch display panel are overlapped with each other. The fingerprint sensor may be implemented by a fingerprint scanning circuit. Please refer to FIG. 3 and the corresponding description for a detailed implementation example of the fingerprint sensor.

The touch sensor 120 is coupled to the control panel 110. In the present embodiment, the touch sensor 120 senses the touch position of the touch panel 110. When a finger of a user or a capacitive sensing element (such as a stylus) touches the touch panel 110, that the finger position information that the touch sensor 120 senses on the touch panel 110 is reported as a touch position in the form of coordinates, and the touch sensor 120 may send information of the touch position to the host controller 132 in the controller 130 and then the host controller 132 may send the touch position to the fingerprint readout circuit 134, or the touch sensor 120 may not pass through the host controller 132 but directly transmit the information of the touch position to the fingerprint readout circuit 134 as the fingerprint position.

The fingerprint readout device 134 determines a fingerprint readout zone according to the fingerprint position and performs a fingerprint sensing operation according to the fingerprint readout zone to obtain a fingerprint image to be determined corresponding to the fingerprint readout zone, and the fingerprint readout device 134 transmits the obtained fingerprint image to be determined to the host controller 132, such that the host controller 132 performs a fingerprint recognition operation according to the fingerprint image to be determined, that is, determines the fingerprint image to be determined belongs to a registered fingerprint image of a user. If the fingerprint recognition operation is successful, the electronic device using the fingerprint recognition device 100 is unlocked and available for use by the user. In contrast, if the fingerprint recognition operation is not successful, in the present embodiment, the user is not immediately notified to change to the pressing position on the touch panel 110 at this time, but the related steps of the present embodiment are continued without the user's awareness so as to perform fingerprint recognition multiple times, thus increasing the accuracy of fingerprint recognition and improving the user's somatosensory feedback on fingerprint recognition.

Figure 2:
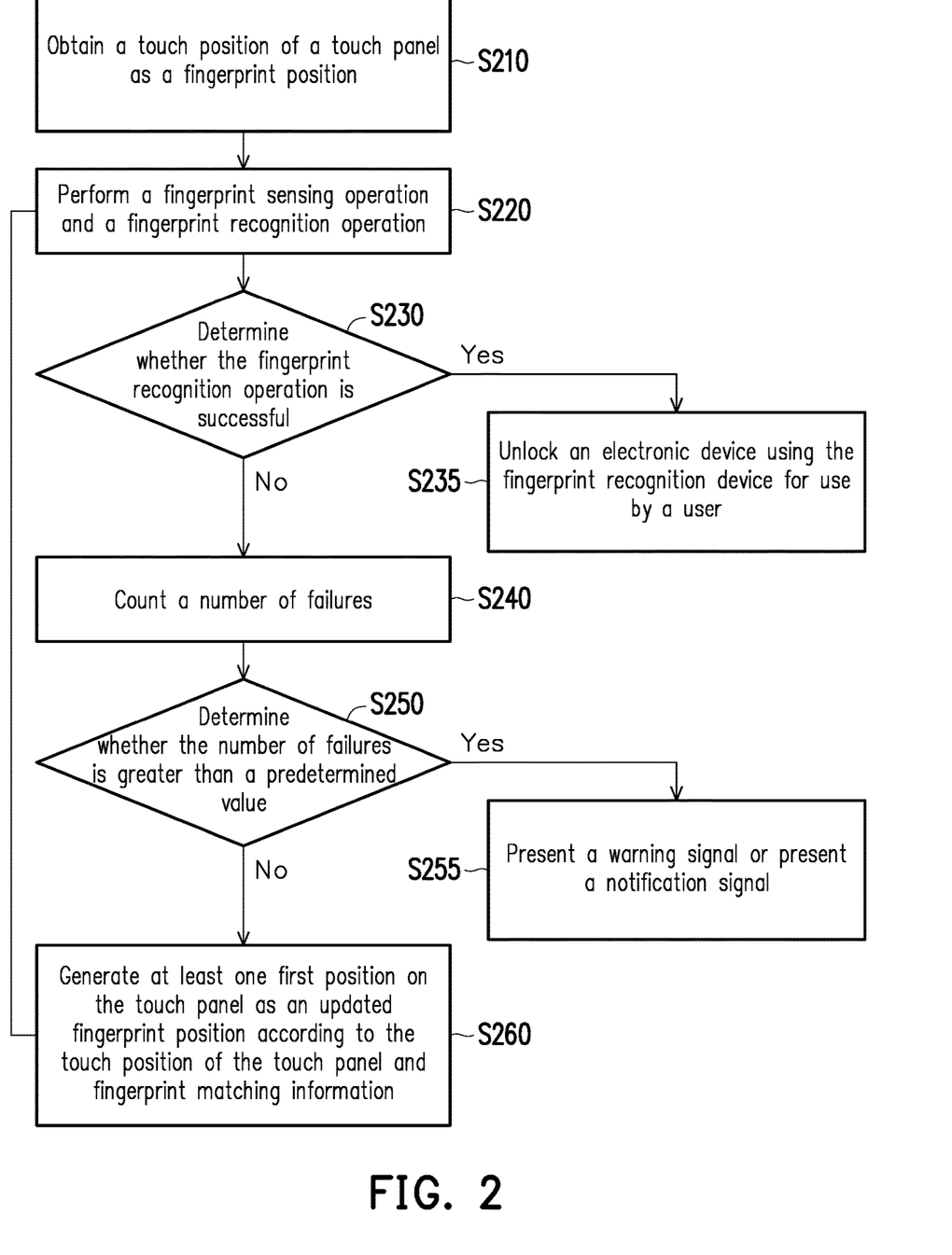
FIG. 2 is a flowchart of a method for fingerprint recognition according to an embodiment of the invention.

FIG. 2 is a flowchart of a method for fingerprint recognition according to an embodiment of the invention. The method for fingerprint recognition in FIG. 2 may be implemented in the fingerprint recognition device 100 in FIG. 1. Please refer to FIG. 1 and FIG. 2 at the same time. In step S210 of FIG. 2, when a user touches or presses the touch panel 110 with a finger or a capacitive sensing element (such as a stylus), the touch sensor 120 senses multiple touched positions on the touch panel 110 and determines a touch coordinate (that is, touch position FP1) from them, and the touch coordinate usually corresponds to the touched position with the maximum touch sensitivity. The host controller 132 of the controller 130 obtains the touch position FP1 of the touch panel 110 from the touch sensor 120. The touch sensor 120 may send information of the touch position to the host controller 132 in the controller 130 and then the host controller 132 may send the touch position to the fingerprint readout circuit 134, or the touch sensor 120 does not pass through the host controller 132 but directly transmits the information of the touch position to the fingerprint readout circuit 134 as the fingerprint position.

In step S220, the host controller 132 of the controller 130 controls the fingerprint readout circuit 134 to perform a fingerprint sensing operation according to the fingerprint position (i.e., the touch position FP1). The steps of the fingerprint sensing operation described in the present embodiment may be described as follows. First, the fingerprint readout circuit 134 sets a readout zone RZ1 located on the touch panel 110 according to the fingerprint position FP1, wherein the fingerprint position FP1 is located in the readout zone RZ1. In the present embodiment, the fingerprint position FP1 is located at the center of gravity of the finger of the user, and the fingerprint position FP1 is the center point of the readout zone RZ1. For example, if the size of the readout zone RZ1 in the present embodiment is 100*100 fingerprint sensing pixels, and the coordinate information of the fingerprint position FP1 is (150, 150), then the fingerprint readout circuit 134 may determine the readout zone RZ1 is (100 to 200, 100 to 200), that is, the coordinate information (150, 150) of the fingerprint position FP1 is used as the center point, and the pixels are expanded by 50 in the horizontal direction and the vertical direction to form the 100*100 readout zone RZ1.

Secondly, the fingerprint readout circuit 134 obtains the fingerprint image to be determined in the readout zone RZ1 of the touch panel 110 via the fingerprint sensor of the touch panel 110. Then, the host controller 132 performs the fingerprint recognition operation according to the fingerprint image to be determined. That is, the host controller 132 determines whether the fingerprint image to be determined belongs to a registered fingerprint image of the user. If the host controller 132 determines that the fingerprint image to be determined belongs to the registered fingerprint image of the user, the fingerprint recognition operation is successful, if the host controller 132 determines that the fingerprint image to be determined is not the registered fingerprint image of the user, then the fingerprint recognition operation failed. The registered fingerprint image is formed by the user registering or entering their own fingerprint information in advance in the fingerprint recognition device 100.

In the present embodiment, the host controller 132 recognizes whether the fingerprint image to be determined obtained by scanning the readout zones (for example, readout zones RZ1 and RZ2 in FIG. 1) by the fingerprint readout circuit 134 is the expected user identity, and the host controller 132 does not have to recognize the complete fingerprint image. The size setting of the readout zones is related to the number of signal processing channels (such as analog front-end circuits or analog-to-digital conversion circuits) of the fingerprint readout circuit 134 that may simultaneously receive fingerprint sensing signals. If the host controller 132 must determine the success of the fingerprint recognition operation based on the fingerprint image information of a larger area than the readout zone RZ1, the fingerprint readout circuit 134 may be controlled to sequentially scan a plurality of readout zones and integrate a plurality of fingerprint images corresponding to the readout zones after scanning into a single fingerprint image and transmit the single fingerprint image to the host controller 132.

In step S230, the host controller 132 determines whether the fingerprint recognition operation is successful. If the host controller 132 determines that the fingerprint recognition operation is successful, step S235 is performed after step S230, and the electronic device using the fingerprint recognition device 100 is unlocked and available for use by the user. In contrast, when the host controller 132 determines that the fingerprint recognition operation is not successful (that is, failed), the host controller 132 in the present embodiment first determines whether the number of failed fingerprint recognition operations is excessive, thereby determining whether to continue performing the fingerprint sensing operation and the fingerprint recognition operation multiple times by adjusting the fingerprint position (see the disclosure of step S260 and S220 in FIG. 2 below) without notifying the user.

In detail, when the fingerprint recognition operation is determined to be not successful (i.e., failed) in step S230, step S240 is performed after step S230, and the host controller 132 of the controller 130 counts a number of failures. In step S250, the host controller 132 of the controller 130 determines whether the number of failures is greater than a preset predetermined value. When the number of failures is not greater than the preset predetermined value, step S260 is performed after step S250, and one of the host controller 132 and the fingerprint readout device 134 generates at least one first position (e.g., a position FP2) located on the touch panel 110 as the updated fingerprint position according to the touch position FP1 of the touch panel 110 and fingerprint matching information, and the fingerprint readout device 134 determines an updated fingerprint readout zone according the at least one updated fingerprint position. Then, step S220 is performed after step S260, and the host controller 132 controls the fingerprint readout device 134 to perform a fingerprint sensing operation according to the updated fingerprint position (the first position FP2). For example, the fingerprint readout device 134 performs the fingerprint sensing operation set on the readout zone RZ2 on the touch panel 110 (or, the readout zone RZ2 of the fingerprint sensor) according to the updated fingerprint position (the first position FP2), the fingerprint readout device 134 obtain the fingerprint image to be determined (as the digital data) by fingerprint sensing pixels distributed in the readout zone RZ2, and the host controller 132 determines whether the fingerprint recognition operation is successful by comparing the fingerprint image to be determined with the registered fingerprint image of the user (e.g., step S230).

Therefore, in the case in which the user does not adjust the pressing position of the finger and the first fingerprint recognition fails, in the present embodiment, at least one first position (the updated fingerprint position) FP2 are generated using the original fingerprint position FP1, and different readout zones are obtained according to the at least one first positions FP2, so as to perform the fingerprint recognition operation multiple times, so that the accuracy of fingerprint recognition may still be increased without having the user change the pressing position multiple times, thus improving the user's somatosensory feedback on fingerprint recognition. In other words, when the fingerprint recognition operation fails and the pressing position of the finger of the user is not changed, the host controller 132 controls the fingerprint readout device 134 to adjust the position of the readout zone to be scanned, so as to probabilistically prevent the readout zone from containing fingerprint areas that are not readily recognized (e.g., injured finger, broken fingerprint, water droplet on finger).

When the number of failures in step S250 is greater than the preset predetermined value, the fingerprint recognition device 100 performs a plurality of fingerprint recognition operations according to a plurality of updated fingerprint positions adjacent to the fingerprint position FP1, but none of the fingerprint recognition operations is successful, and therefore at this point the fingerprint recognition should be regarded as a failure. At this time, step S255 is performed after step S250, and the host controller 132 may present a warning signal via the sound effect of the display panel 110 or the electronic device, and the warning signal is used to notify the user to indicate that the fingerprint recognition is not successful. Alternatively, the host controller 132 may also present a notification signal via the sound effect of the display panel 110 or the electronic device to notify the user to change the pressing position of the finger of the user (for example, the user is asked to lift the finger and press it somewhere in the fingerprint sensing area on the display panel 110 again to change the fingerprint position of the finger, and steps S210 to S260 are repeated to perform fingerprint recognition again). In contrast, when steps S220, S230, S240, S250, and S260 are performed again, the host controller 132 does not present a notification signal to notify the user to change the pressing position of the finger of the user. In the above embodiments, the steps performed by the host controller 132 may be implemented by hardware digital circuits or software programs in the host controller 132.

Figure 3:
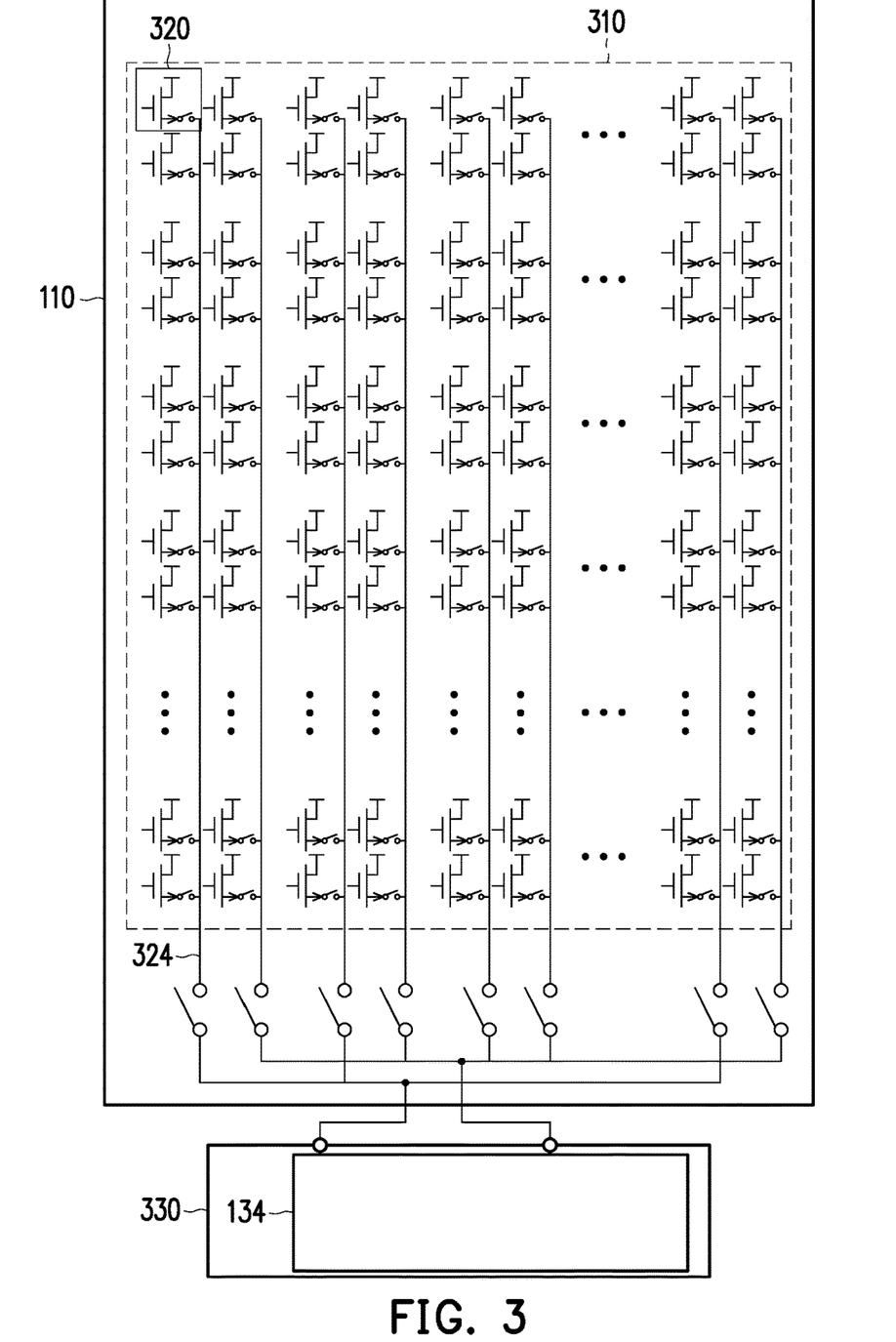
FIG. 3 is a circuit diagram of the display panel, a fingerprint sensor thereof, and a fingerprint readout circuit in the controller in FIG. 1.

The fingerprint sensor and the fingerprint readout circuit in the touch panel 110 are described here. FIG. 3 is a circuit diagram of the display panel 110, a fingerprint sensor thereof, and the fingerprint readout circuit 134 in the controller 130 in FIG. 1. The fingerprint sensor 310 in the touch panel 110 has a plurality of fingerprint sensing pixel circuits 320. The fingerprint sensor 310 may be embedded in the display panel 110 or may be presented as an independent fingerprint sensing panel. The fingerprint sensing panel and the display panel 110 are combined with each other so that the fingerprint sensing area (that is, the area covered by the fingerprint sensor 310) on the fingerprint sensing panel and the display area on the display panel 110 are overlapped with each other. The area covered by the fingerprint sensor 310 is all or a portion of the display area on the display panel 110, and those applying the present embodiment may adjust the area covered by the fingerprint sensor 310 according to their needs.

The fingerprint sensor 310 of the present embodiment includes X*Y fingerprint sensing circuits for forming a pixel array, and X and Y are both positive integers.

A single fingerprint sensing circuit 320 in FIG. 3 is depicted as an omitted schematic in which the fingerprint sensing circuit 320 includes a transistor and a switch. If the fingerprint sensor is an optical fingerprint sensor, the actual fingerprint sensing circuit includes a photosensitive element, a storage capacitor, and multiple transistors to implement operations such as resetting, exposing, and capturing images of fingerprint sensing pixels. FIG. 3 only shows a voltage follower (illustrated as a transistor in short) and the selection transistor (illustrated as a switch in short) in the fingerprint sensing circuit 320. The fingerprint sensor captures images row by row, the fingerprint sensor pixels in the same column are connected to the same sensing line 324, and the sensing voltage Sout is output to the fingerprint readout device 134 through the same sensing line 324. The multiple sensing lines of the fingerprint sensor can be as shown in FIG. 3, the multiple sensing lines are grouped into the fingerprint readout device 134 at intervals, so that the position of the readout zone in the horizontal direction may be flexibly set.

The fingerprint readout circuit 134 in FIG. 1 is located in a chip 330 of FIG. 3. The chip 330 is the fingerprint readout device 134, the touch sensor 120 and a display driver integrated into a fingerprint, touch and display driver integrated chip.

Here, the operations of the touch sensor 120, the host controller 132, and the fingerprint readout circuit 134 in FIG. 1 on each step in FIG. 2 in different embodiments are described.

In some embodiments, in response to the host controller 132 determines that the fingerprint recognition operation is not successful, the fingerprint readout device 134 actively generates at least one first position FP2 of the touch panel 110 as the updated fingerprint position (step S260) according to the touch position FP1 of the touch panel 110 and the finger matching information. In addition, when the host controller 132 decides to proceed to step S260 and the subsequent step S220 after step S240 and step S250, the fingerprint readout device 134 actively performs the fingerprint sensing operation according to the updated fingerprint position and is not controlled by the host controller 132.

Figure 4:
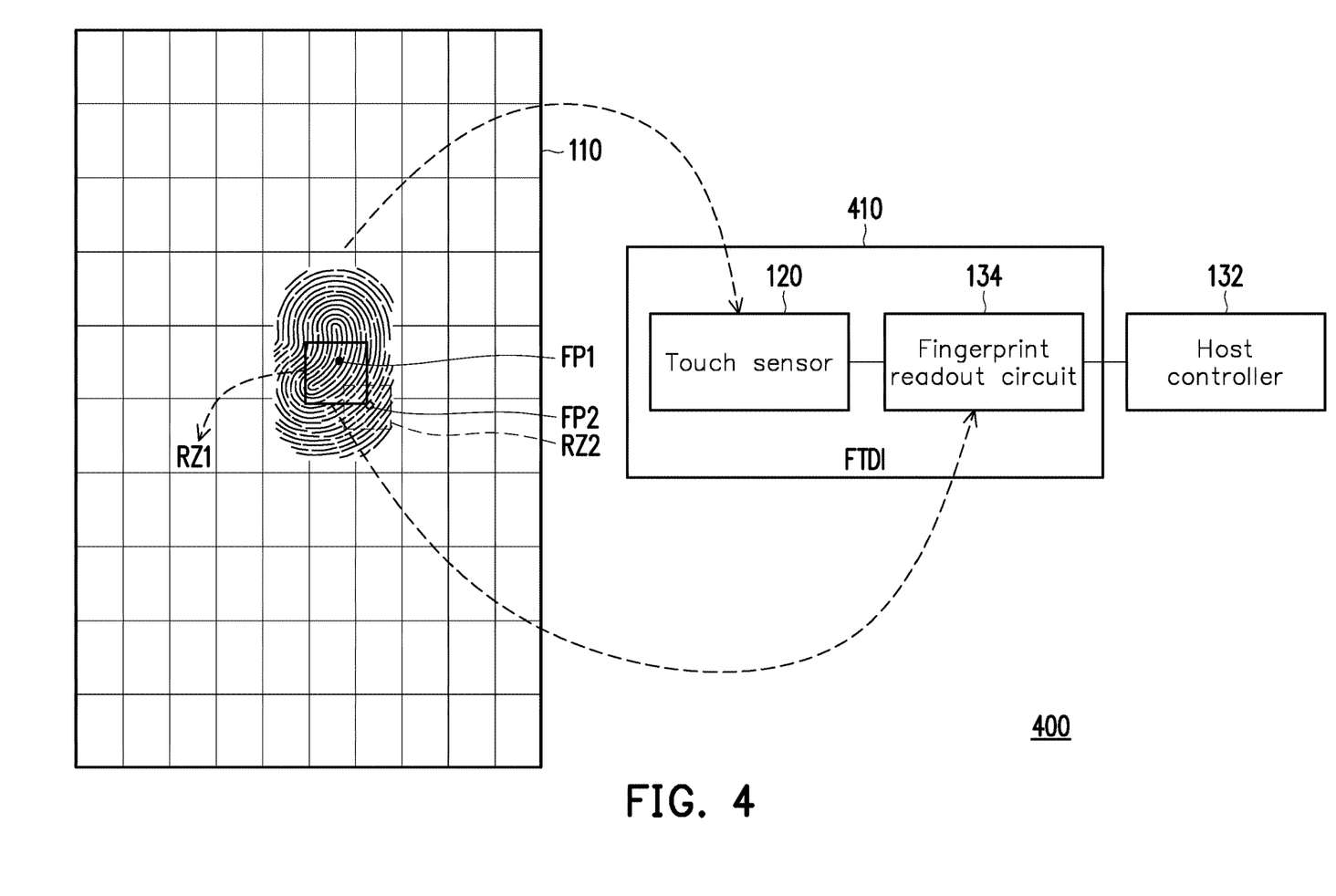
FIG. 4 is a diagram of a fingerprint recognition device according to another embodiment of the invention.

FIG. 4 is a diagram of a fingerprint recognition device 400 according to another embodiment of the invention. The touch panel 110, the touch sensor 120, the host controller 132, and the fingerprint readout circuit 134 in FIG. 4 are all the same as the corresponding elements in FIG. 4. The difference between FIG. 1 and FIG. 4 is that both the touch sensor 120 and the fingerprint readout device 134 are used to control the display panel 110, so in the present embodiment, the touch sensor 120 and the fingerprint readout device 134 are integrated with each other into a fingerprint, touch, and display driver integrated (FTDI) chip 410.

In some embodiments, the host controller 132 is an active controller, and the FTDI chip 410 is passively controlled by the host controller 132 to implement corresponding functions. In detail, please refer to FIG. 2 and FIG. 4 at the same time. In step S210, the touch sensor 120 in the FTDI chip 410 generates the touch position FP1 of the touch panel 110. The host controller 132 controls the FTDI chip 410 to perform a fingerprint sensing operation according to the fingerprint position FP1 and then the host controller 132 performs the fingerprint recognition operation (step S220), and the host controller 132 determines whether the fingerprint recognition operation is successful (step S230). In response to the host controller 132 determines that the fingerprint recognition operation is not successful, the host controller 132 generates at least one first position FP2 of the touch panel 110 as the updated fingerprint position according to the touch position FP1 of the touch panel 110 and the finger position information (generated by the host controller 132), and then the fingerprint readout circuit 134 determines the updated fingerprint readout zone (step S260). The fingerprint readout device 134 performs the fingerprint sensing operation according to the updated fingerprint readout zone and the host controller 132 performs the fingerprint recognition operation (step S220).

In some embodiments, the host controller 132 and the FTDI chip 410 are both active controllers. In particular, the FTDI chip 410 may actively perform step S260. In detail, please refer to FIG. 2 and FIG. 4 at the same time. In step S210, the touch sensor 120 in the FTDI chip 410 generates the touch position FP1 of the touch panel 110. The host controller 132 controls the FTDI chip 410 to perform a fingerprint sensing operation according to the fingerprint position FP1 and then the host controller 132 performs the fingerprint recognition operation (step S220), and the host controller 132 determines whether the fingerprint recognition operation is successful (step S230). In response to the host controller 132 determines that the fingerprint recognition operation is not successful, the fingerprint readout device 134 in the FTDI chip 410 actively generates at least one first position FP2 of the touch panel 110 as the updated fingerprint position according to the touch position FP1 of the touch panel 110 and the finger matching information (generated by the host controller 132), and then the fingerprint readout circuit 134 determines the updated fingerprint readout zone (step S260), and the FTDI chip 410 actively performs the fingerprint sensing operation according to the updated fingerprint readout zone and the host controller 132 performs the fingerprint recognition operation (step S220).

Figure 5:
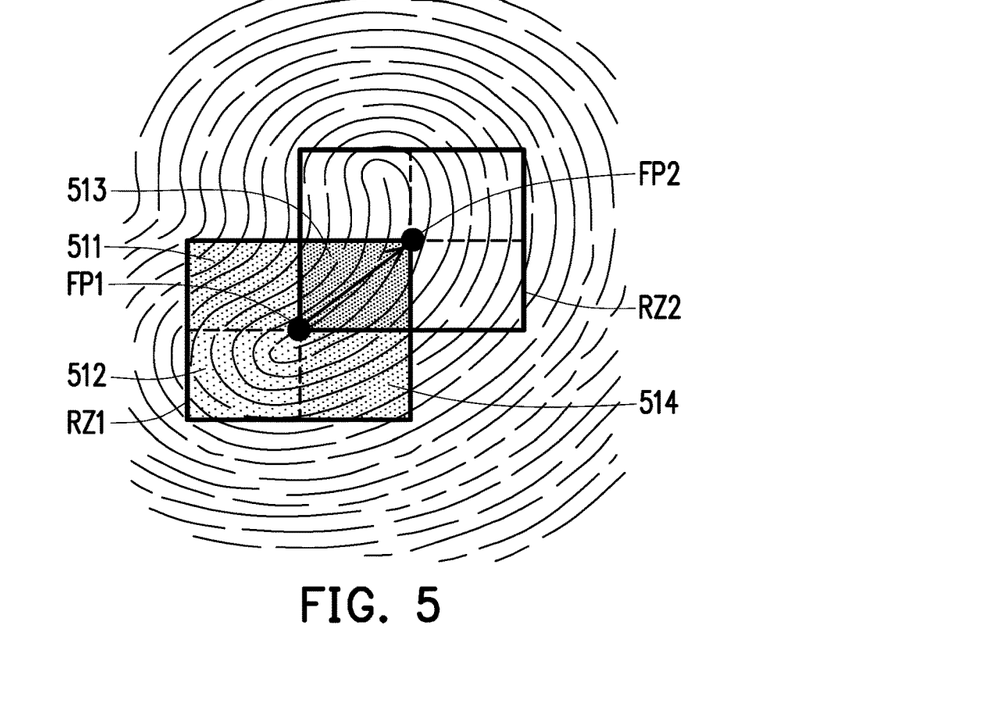
FIG. 5 is a diagram of a first embodiment of generating a first position of the touch panel in step S260 in FIG. 2.

Here, how to generate at least one first position of the touch panel according to the touch position of the touch panel in step S260 in FIG. 2 is described, and various embodiments that may be implemented are listed. FIG. 5 is a diagram of a first embodiment of generating a first position of the touch panel in step S260 in FIG. 2. As shown in FIG. 5, when the host controller 132 determines the fingerprint recognition operation is not successful and step S260 in FIG. 2 is to be performed, the host controller 132 divides the fingerprint image to be determined obtained via the readout zone RZ1 into a plurality of image areas. The center point of the fingerprint image to be determined in the present embodiment is the fingerprint position FP1, and the fingerprint image to be determined is evenly divided into four image areas 511 to 514. In addition, the host controller 132 compares each of the image areas 511 to 514 with a corresponding image located in the registered fingerprint image of the user to calculate a matching value for each image area, and thus each of the image areas 511 to 514 is scored, and the matching value or the score value is regarded as the fingerprint matching information. In other words, the host controller 132 calculates the matching value of each of the image areas 511 to 514 according to a degree of image difference between each of the image areas 511 to 514 and a preset registered fingerprint image. When the image difference between the image areas 511 to 514 and the preset registered fingerprint image is greater, the calculated matching value is smaller; when the image difference between the image areas 511 to 514 and the preset registered fingerprint image is smaller, the calculated matching value is greater.

After the matching value of each of the image areas 511 to 514 is calculated, because the matching value of the image area 513 has the largest value compared to the other matching values, the host controller 132 or the fingerprint readout circuit 134 determines one of the image areas having the largest matching value (for example, the image area 513) as the selected image area. Then, the host controller 132 or the fingerprint readout circuit 134 sets a position in the selected image area 513 (for example, a vertex in the image area 513 relative to the fingerprint position FP1) as the first position FP2 of the touch panel 110 (the updated fingerprint position) and determines the updated fingerprint readout zone. That is, the host controller 132 or the fingerprint readout circuit 134 moves the fingerprint position FP1 to a first quadrant to generate the first position FP2, and sets the readout zone RZ2 according to the first position FP2 as the updated fingerprint coordinate and performs a fingerprint recognition operation. In the present embodiment, if the fingerprint recognition operation performed based on the first position FP2 is still not successful, the original fingerprint position FP1 in FIG. 5 may be replaced with the first position FP2 and the corresponding steps of generating the first position are repeated, so as to suitably expand the application mode of the present embodiment.

Figure 6:
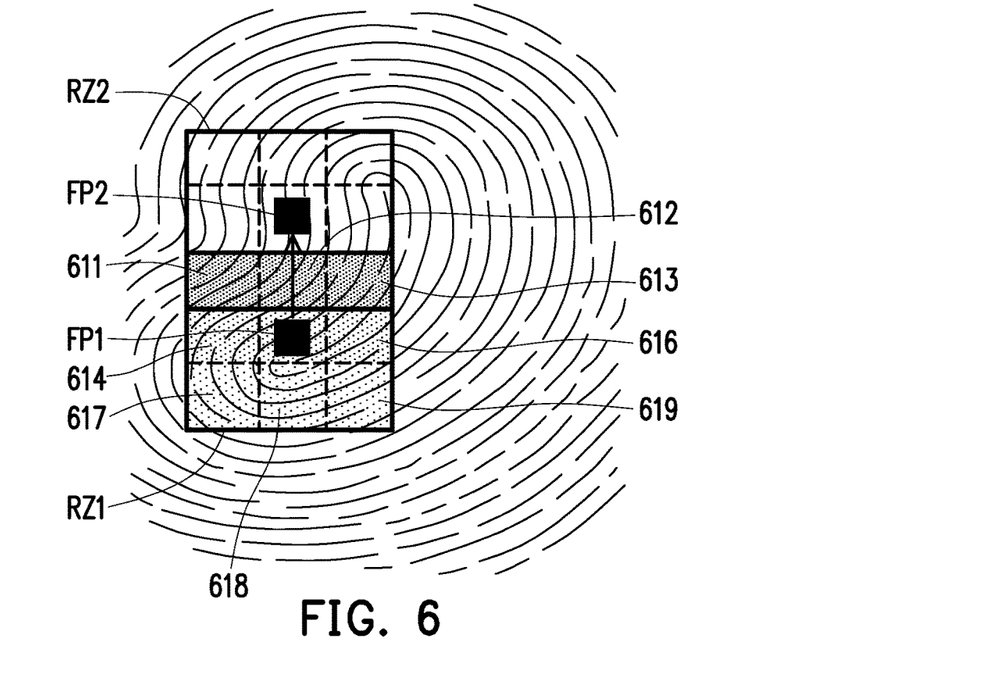
FIG. 6 is a diagram of a second embodiment of generating a first position of the touch panel in step S260 in FIG. 2.

FIG. 6 is a diagram of a second embodiment of generating a first position of the touch panel in step S260 in FIG. 2. As shown in FIG. 6, when the host controller 132 determines the fingerprint recognition operation is not successful and step S260 in FIG. 2 is to be performed, the host controller 132 divides the fingerprint image to be determined obtained via the readout zone RZ1 into a plurality of image areas (such as 9 image areas 611 to 619). The host controller 132 compares each of the image areas 611 to 619 with a corresponding image located in the registered fingerprint image of the user to calculate a matching value for each of the image areas 611 to 619, and thus each of the image areas 611 to 619 is scored. If the matching values of the image areas 611, 612, and 613 are greater than the other matching values, the host controller 132 or the fingerprint readout circuit 134 moves the fingerprint position FP1 upward to generate the first position FP2, and sets the readout zone RZ2 according to the first position FP2 as the updated fingerprint coordinate and performs a fingerprint recognition operation. In the present embodiment, if the fingerprint recognition operation performed based on the first position FP2 is still not successful, the host controller 132 or the fingerprint readout circuit 134 replaces the original fingerprint position FP1 in FIG. 6 with the first position FP2 and the corresponding steps of generating the first position are repeated, so as to suitably expand the application mode of the present embodiment.

Figure 7:
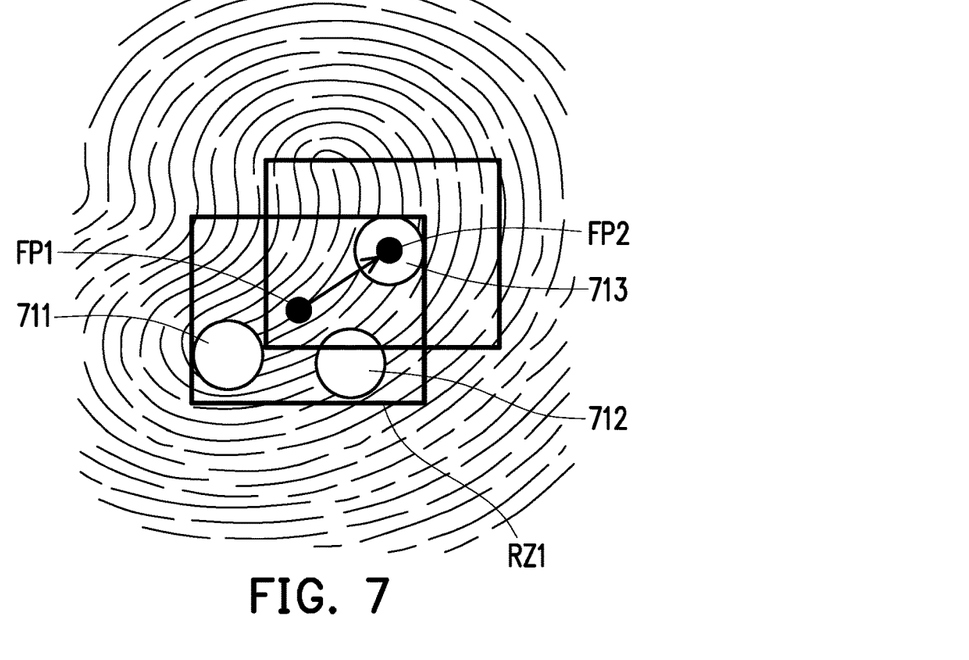
FIG. 7 is a diagram of a third embodiment of generating a first position of the touch panel in step S260 in FIG. 2.

FIG. 7 is a diagram of a third embodiment of generating a first position of the touch panel in step S260 in FIG. 2. As shown in FIG. 7, when the host controller 132 determines the fingerprint recognition operation is not successful and step S260 in FIG. 2 is to be performed, the host controller 132 randomly divides the fingerprint image to be determined obtained via the readout zone RZ1 into a plurality of image areas (such as 3 image areas 711 to 713). The host controller 132 compares each of the image areas 711 to 713 with a corresponding image located in the registered fingerprint image of the user to calculate a matching value for each of the image areas 711 to 713, and thus each of the image areas 711 to 713 is scored. If the matching value of the image area 713 is greater than the other matching values, the host controller 132 or the fingerprint readout circuit 134 moves the fingerprint position FP1 toward the center area of the image area 713 to generate the first position FP2 (that is, the center area of the image area 713 is set to the first position FP2), and the first position FP2 is set as the updated fingerprint position. The fingerprint readout circuit 134 may set the readout zone RZ2 to perform the fingerprint recognition operation.

Figure 8:
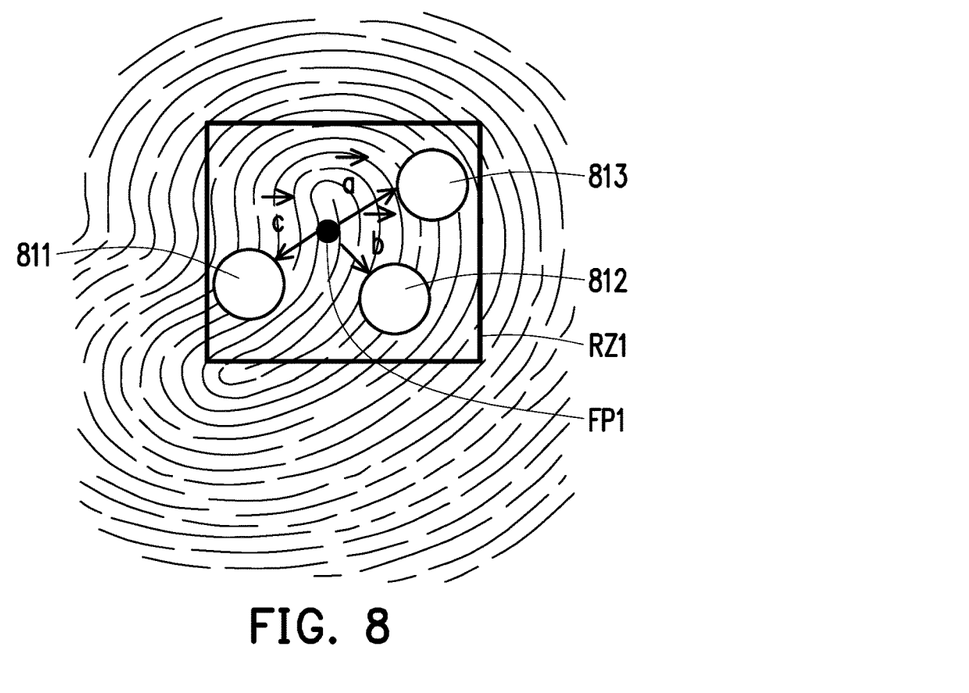
FIG. 8 is a diagram of a fourth embodiment of generating a first position of the touch panel in step S260 in FIG. 2.

FIG. 8 is a diagram of a fourth embodiment of generating a first position of the touch panel in step S260 in FIG. 2. As shown in FIG. 8, when the controller 130 determines the fingerprint recognition operation is not successful and step S260 in FIG. 2 is to be performed, the host controller 132 or the fingerprint readout circuit 134 randomly divides the fingerprint image to be determined obtained via the readout zone RZ1 into a plurality of image areas (such as 3 image areas 811 to 813). The host controller 1320 compares each of the image areas 811 to 813 with a corresponding image located in the registered fingerprint image of the user to calculate a matching value for each of the image areas 711 to 713, and calculates the weight of each of the image areas according to the matching value of each of the image areas 711 to 713. Then, the host controller 132 or the fingerprint readout circuit 134 may calculate the motion vector according to the weight of each of the image areas 711 to 713, the matching value of each of the image areas 711 to 713, and the distance between the image areas 711 to 713 and the fingerprint position FP1 of the touch panel 110, and the first position FP2 is set according to the motion vector and the fingerprint position FP1.

For example, in the case that the weight of the image area 811 is expressed as w1, the vector between the center point of the image area 811 and the fingerprint position FP1 is expressed as Va, the weight of the image area 812 is expressed as w2, the vector between the center point of the image area 812 and the fingerprint position FP1 is expressed as Vb, the weight of the image area 813 is expressed as w3, and the vector between the center point of the image area 813 and the fingerprint position FP1 is expressed as Vc. Therefore, the distance and direction of a motion vector Vd needed for the fingerprint position FP1 to generate the first position FP2 may be calculated using the following equation (1):

$$Vd = Va \times w1 + Vb \times w2 + Vc \times w3 \quad (1)$$

That is, in the present embodiment, the motion vector Vd from the fingerprint position FP1 to the first position FP2 is calculated using the image areas 811 to 813 and the corresponding weights w1 to w3 using a vector method, thereby generating the corresponding first position, and the readout zone is reset according to the first position as an updated fingerprint coordinate and a fingerprint recognition operation is performed.

Based on the above, in the fingerprint recognition device and the corresponding method of an embodiment of the invention, another position as the updated fingerprint position adjacent to the touch position is automatically generated according to the touch position provided by the touch sensor when the first fingerprint recognition fails, and the updated fingerprint readout zone is set using the updated fingerprint position to perform fingerprint recognition again. Therefore, in the present embodiment, when the user does not adjust the pressing position of the finger and the fingerprint recognition fails for the first time, fingerprint recognition is performed multiple times based on different readout zones, so that the accuracy of fingerprint recognition may still be increased without the user changing the pressing position multiple times, thus improving the user's somatosensory feedback on fingerprint recognition.

What is claimed is:

1. A fingerprint recognition device, comprising:
a touch panel;
a fingerprint sensor;
a touch sensor coupled to the touch panel to sense a touch position of the touch panel;
a host controller coupled to the touch sensor; and
a fingerprint readout device coupled to the fingerprint sensor and the host controller,
wherein the fingerprint readout device determines a fingerprint readout zone according to the fingerprint position and performs a fingerprint sensing operation in the fingerprint readout zone, to obtain a fingerprint image to be determined corresponding to the fingerprint readout zone;
the host controller performs a fingerprint recognition operation according to the fingerprint image to be determined, and,
one of the host controller and the fingerprint readout device performs the fingerprint sensing operation in an updated fingerprint readout zone different from the fingerprint readout zone to obtain an updated fingerprint image to be determined while no other touch position is obtained, in response to that the fingerprint recognition operation to the fingerprint image to be determined is not successful.

2. The fingerprint recognition device of claim 1, wherein the touch sensor and the fingerprint readout device are integrated into a fingerprint, touch, and display driving integrated (FTDI) chip.

3. The fingerprint recognition device of claim 1, wherein the touch sensor and the fingerprint readout device are integrated into two different chips.

4. The fingerprint recognition device of claim 1, wherein the host controller determines whether the fingerprint image to be determined belongs to a registered fingerprint image of a user, to determine whether the fingerprint recognition operation is successful.

5. The fingerprint recognition device of claim 1, wherein one of the host controller and the fingerprint readout device generates at least one first position of the touch panel according to the touch position of the touch panel and a fingerprint matching information while no other touch position is obtained in response to determining that the fingerprint recognition operation is not successful, and the fingerprint readout device determines the updated fingerprint readout zone according to the at least one first position and performs the fingerprint sensing operation according to the updated fingerprint readout zone.

6. The fingerprint recognition device of claim 5, wherein the host controller divides the fingerprint image to be determined into a plurality of image areas in response to the host controller determines that the fingerprint recognition operation is not successful, wherein a center point of the fingerprint image to be determined is the fingerprint position,
the host controller compares each of the image areas with a corresponding image located in a registered fingerprint image of the user to calculate a matching value for each of the image areas as the fingerprint matching information, and one of the host controller and the fingerprint readout device generates the at least one first position of the touch panel according to the image area and the matching value corresponding to each of the image areas.

7. The fingerprint recognition device of claim 6, wherein one of the host controller and the fingerprint readout device determines one of the image areas having a maximum matching value as a selected image area, and sets a position in the selected image area as the at least one first position of the touch panel.

8. The fingerprint recognition device of claim 6, wherein one of the host controller and the fingerprint readout device calculates a weight of each of the image areas according to the matching value of each of the image areas, calculates a motion vector according to the weight of each of the image areas, the matching value of each of the image areas, and a distance between each of the image areas and the fingerprint position of the touch panel, and sets the at least one first position of the touch panel according to the motion vector and the fingerprint position of the touch panel.

9. The fingerprint recognition device of claim 6, wherein the host controller counts a number of failures when the fingerprint recognition operation is determined to not be successful, and determines whether the number of failures is greater than a predetermined value,
the host controller presents a warning signal to notify the user that the fingerprint recognition operation is not successful in response to determining that the number of failures is greater than the predetermined value, or presents a notification signal to notify the user to change a pressing position of a finger of the user.

10. The fingerprint recognition device of claim 9, wherein in response to the host controller determines that the number of failures is not greater than the predetermined value, the fingerprint readout device performs the fingerprint sensing operation according to the updated fingerprint readout zone to obtain a second fingerprint image to be determined corresponding to the fingerprint readout zone, and the host controller performs the fingerprint identification operation according to the second fingerprint image to be determined.

11. The fingerprint recognition device of claim 1, wherein the fingerprint sensor is embedded in the touch panel.

12. The fingerprint recognition device of claim 1, wherein the fingerprint sensor is disposed outside the touch panel.

13. A method for fingerprint recognition, comprising:
obtaining a touch position of a touch panel as a fingerprint position;
determining a fingerprint readout zone according to the fingerprint position, and performing a fingerprint sensing operation in the fingerprint readout zone to obtain a fingerprint image to be determined corresponding to the fingerprint readout zone;
performing a fingerprint recognition operation according to the fingerprint image to be determined; and
performing the fingerprint sensing operation in an updated fingerprint readout zone different from the fingerprint readout zone to obtain an updated fingerprint image to be determined while no other touch position is obtained, in response to that the fingerprint recognition operation to the fingerprint image to be determined is not successful.

14. The method for fingerprint recognition of claim 13, wherein the step of performing the fingerprint recognition operation according to the fingerprint image to be determined comprises:

determining whether the fingerprint image to be determined belongs to a registered fingerprint image of a user, to determine whether the fingerprint recognition operation is successful.

15. The method for fingerprint recognition of claim 13, wherein the step of performing the fingerprint sensing operation in the updated fingerprint readout zone different from the fingerprint readout zone to obtain an updated fingerprint image to be determined while no other touch position is obtained comprises:
   generating at least one first position of the touch panel according to the touch position of the touch panel and a fingerprint matching information; and
   determining the updated fingerprint readout zone according to the at least one first position; and
   performing the fingerprint sensing operation according to the updated fingerprint readout zone.

16. The method for fingerprint recognition of claim 15, wherein the step of generating the at least one first position of the touch panel according to the touch position of the touch panel and the fingerprint matching information comprises:
   dividing the fingerprint image to be determined into a plurality of image areas in response to determining that the fingerprint recognition operation is not successful, wherein a center point of the fingerprint image to be determined is the fingerprint position;
   comparing each of the image areas with a corresponding image located in a registered fingerprint image of a user to calculate a matching value for each of the image areas as the fingerprint matching information; and
   generating the at least one first position of the touch panel according to the image area and the matching value corresponding to each of the image areas.

17. The method for fingerprint recognition of claim 16, wherein the step of generating the at least one first position of the touch panel according to the image area and the matching value corresponding to each of the image areas comprises:
   determining one of the image areas having a maximum matching value as a selected image area; and
   setting a position in the selected image area as the at least one first position of the touch panel.

18. The method for fingerprint recognition of claim 16, wherein the step of generating the at least one first position of the touch panel according to the image area and the matching value corresponding to each of the image areas comprises:
   calculating a weight of each of the image areas according to the matching value of each of the image areas;
   calculating a motion vector according to the weight of each of the image areas, the matching value of each of the image areas, and a distance between each of the image areas and the fingerprint position of the touch panel; and
   setting the at least one first position of the touch panel according to the motion vector and the fingerprint position of the touch panel.

19. The method for fingerprint recognition of claim 13, further comprising:
   counting a number of failures when the fingerprint recognition operation is determined to not be successful;
   determining whether the number of failures is greater than a predetermined value; and
   presenting a warning signal to notify a user that the fingerprint recognition operation is not successful in response to determining that the number of failures is greater than the predetermined value, or presenting a notification signal to notify the user to change a pressing position of a finger of the user.

20. The method for fingerprint recognition of claim 19, further comprising:
   in response to determining that the number of failures is not greater than the predetermined value, performing the fingerprint sensing operation according to the updated fingerprint readout zone to obtain a second fingerprint image to be determined corresponding to the fingerprint readout zone, and performing the fingerprint identification operation according to the second fingerprint image to be determined.

21. A method for a fingerprint readout device, comprising:
   obtaining a touch position of a touch panel as a fingerprint position;
   determining a fingerprint readout zone according to a fingerprint position;
   performing a fingerprint sensing operation in the fingerprint readout zone to obtain a fingerprint image to be determined corresponding to the fingerprint readout zone; and
   performing the fingerprint sensing operation in an updated fingerprint readout zone different from the fingerprint readout zone to obtain an updated fingerprint image to be determined while no other touch position is obtained, in response to that a fingerprint recognition operation to the fingerprint image to be determined is not successful.

22. The method of claim 21, wherein the step of performing the fingerprint sensing operation in the updated fingerprint readout zone different from the fingerprint readout zone to obtain an updated fingerprint image to be determined while no other touch position is obtained comprises:
   generating at least one first position of the touch panel according to the touch position of the touch panel and a fingerprint matching information; and
   determining the updated fingerprint readout zone according to the at least one first position; and
   performing the fingerprint sensing operation according to the updated fingerprint readout zone.

23. The method of claim 22, wherein the step of generating the at least one first position of the touch panel according to the touch position of the touch panel and the fingerprint matching information comprises:
   dividing the fingerprint image to be determined into a plurality of image areas, wherein a center point of the fingerprint image to be determined is the fingerprint position.

24. The method of claim 21, further comprising:
   in response to that a number of failures counted when the fingerprint recognition operation is determined to not be successful is determined not greater than the predetermined value, performing the fingerprint sensing operation according to the updated fingerprint readout zone to obtain a second fingerprint image to be determined corresponding to the fingerprint readout zone.

* * * * *